E. T. ROBINSON.
GARMENT, UMBRELLA, AND CANE RACK FOR AUTOMOBILES.
APPLICATION FILED FEB. 11, 1908.
904,150.
Patented Nov. 17, 1908.
Fig. I.
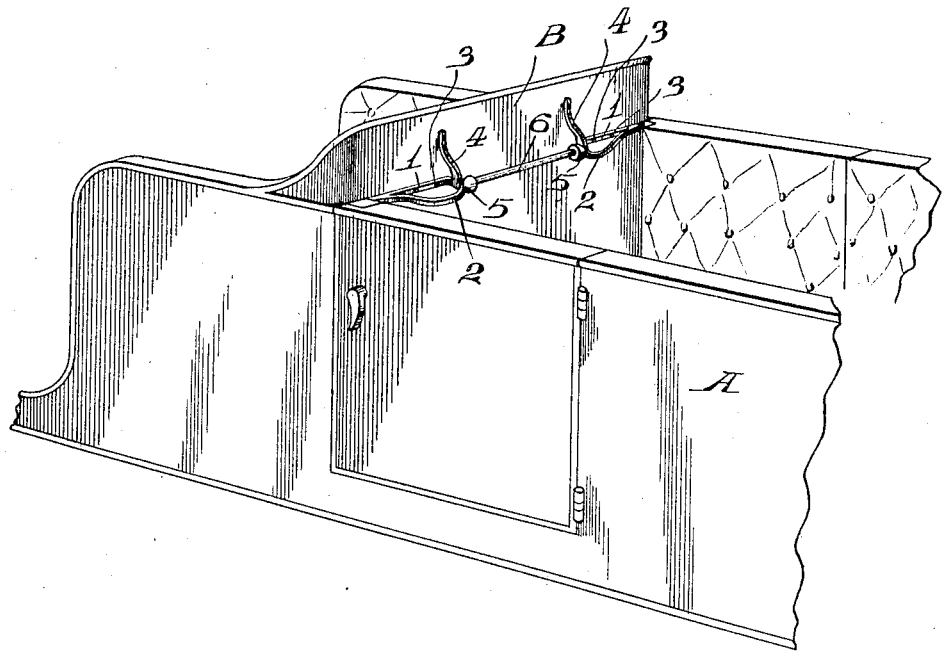
Fig. II.
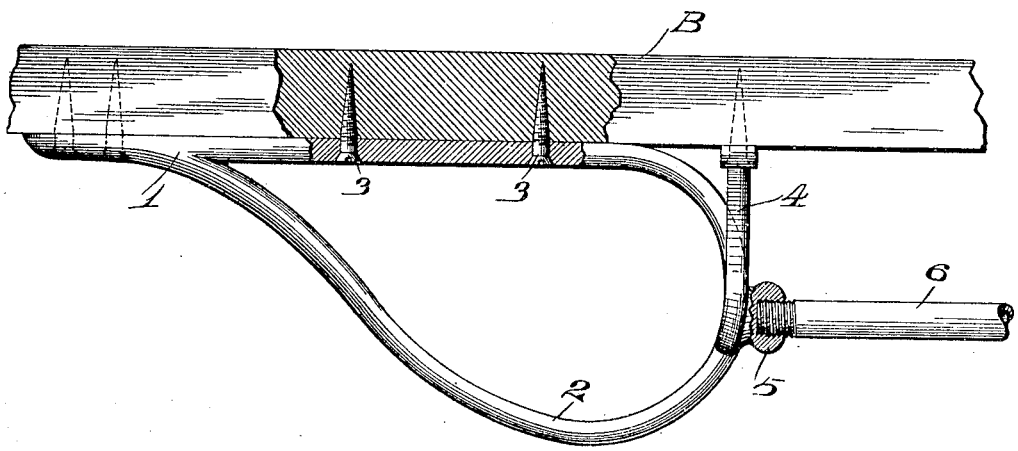
Attest.
H. J. Fletcher,
Blanche Hogan
Inventor.
E. T. Robinson.
By Geo. H. Knight
atty.

UNITED STATES PATENT OFFICE.

EDWARD T. ROBINSON, OF ST. LOUIS, MISSOURI, ASSIGNOR TO ST. LOUIS CAR COMPANY, OF ST. LOUIS, MISSOURI, A CORPORATION.

GARMENT, UMBRELLA, AND CANE RACK FOR AUTOMOBILES.

No. 904,150.  Specification of Letters Patent.  Patented Nov. 17, 1908.

Application filed February 11, 1908. Serial No. 415,356.

*To all whom it may concern:*

Be it known that I, EDWARD T. ROBINSON, a citizen of the United States of America, residing in the city of St. Louis and State of Missouri, have invented certain new and useful Improvements in Garment, Umbrella, and Cane Racks for Automobiles, of which the following is a full, clear, and exact description, reference being had to the accompanying drawing, forming part of this specification.

My invention relates to a rack adapted to be attached to a fixed part of an automobile to receive coats, wraps or other garments and umbrellas and canes belonging to the user of an automobile.

Figure I is a perspective view of part of an automobile body with my rack in position for use. Fig. II is an enlarged view partly in plan and partly in section of portions of the rack.

In the accompanying drawings: A designates the body of an automobile and B the back of the front seat in said body.

1 designates a pair of horizontal brackets having horizontal loops 2 and the rear longitudinal portions of which are adapted to be secured by screws 3 or other suitable fastening means to the seat back B, as seen most clearly in Fig. II. When the brackets 1 are attached to the seat back they serve to receive umbrellas and canes and support them in upright positions in the body of the automobile.

4 is a stay arm extending upwardly and inwardly from the inner end of each bracket 1 at the inner end of its loop, each arm being secured to the seat back B by screws or other suitable fastening means. These arms have, in addition to their function of connecting the brackets to the seat back, the function of stiffening the connection between the brackets and the seat back. At the inner end of the loop 2 of each bracket 1 is a tapped or socketed boss 5.

6 is a connecting cross rod having threaded ends that are fitted in the tapped bosses 5 and which extends from one of the brackets to the other bracket at a distance from the back of the brackets, as seen in Fig. II, in order that garments, such as coats and wraps, may be placed over the cross rod to be supported thereon.

I claim:

1. A rack of the character described, comprising a horizontal bracket having a horizontal loop and adapted to be secured to the body of a vehicle, and a stay arm extending upwardly and inwardly from the inner end of said loop, substantially as set forth.

2. A rack of the character described, comprising a pair of horizontal brackets having horizontal loops, and adapted to be secured to the body of a vehicle, and a cross rod mounted between and connected to the loops of said brackets, substantially as set forth.

EDWARD T. ROBINSON.

In presence of—
A. DIEKMANN,
M. O. MURPHY.